R. GUILL & G. L. SHAWVER.
OVERSPEED DEVICE.
APPLICATION FILED JAN. 11, 1917.
1,237,203.
Patented Aug. 14, 1917.
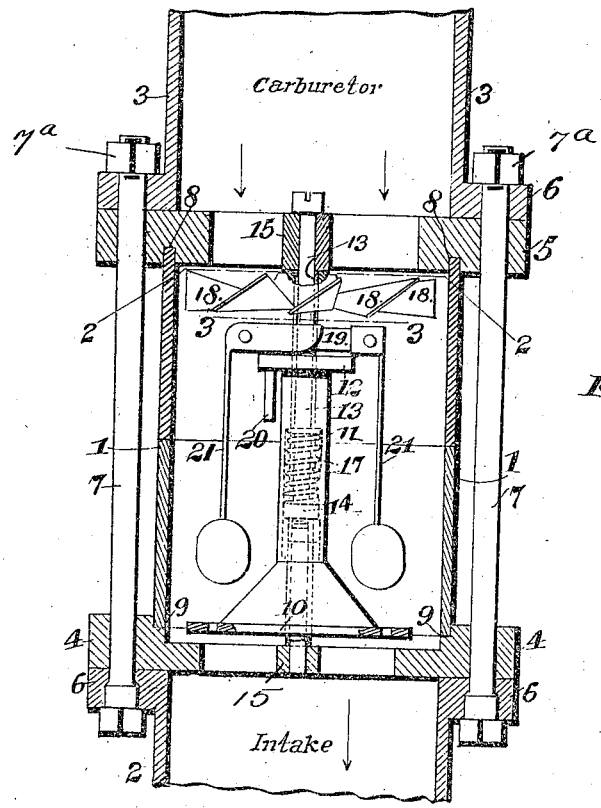
Fig. 1.
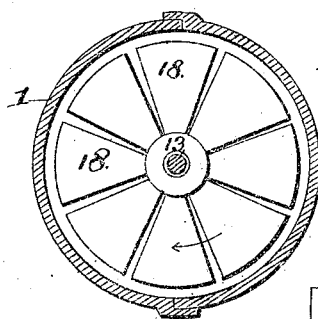
Fig. 2.
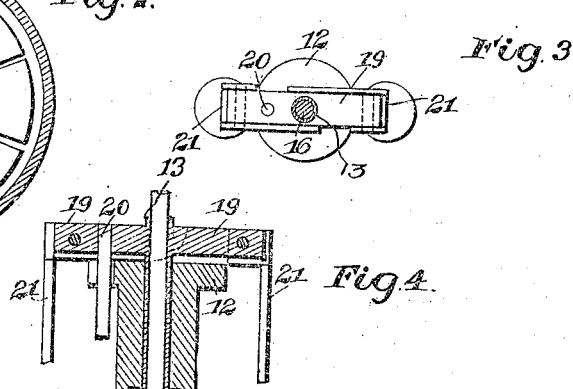
Fig. 3.
Fig. 4.
WITNESSES
John S. Schrott
W. E. Beck
INVENTORS
Richard Guill
Glen L. Shawver
BY
ATTORNEYS

UNITED STATES PATENT OFFICE.

RICHARD GUILL AND GLEN LAKE SHAWVER, OF CHARLESTON, WEST VIRGINIA.

OVERSPEED DEVICE.

1,237,203.  Specification of Letters Patent.  Patented Aug. 14, 1917.

Application filed January 11, 1917. Serial No. 141,918.

*To all whom it may concern:*

Be it known that we, RICHARD GUILL and GLEN LAKE SHAWVER, citizens of the United States, and residents of Charleston, in the county of Kanawha and State of West Virginia, have invented Overspeed Devices, of which the following is a specification.

Our invention is an overspeed device, and has for its object to provide a device of the character specified, for internal combustion engines, and adapted to be arranged between the carbureter and the intake manifold, and wherein the overspeed device controls the supply of mixture to the engine, and is controlled by the speed of the engine and by the inrush of the mixture.

In the drawings:

Figure 1 is a longitudinal section of the overspeed device casing.

Figs. 2 and 3 are sections on the lines 2—2 and 3—3, respectively, of Fig. 1.

Fig. 4 is a sectional view through the valve stem and its connections.

The present embodiment of the invention is arranged within a sectional casing 1, which is interposed between the intake manifold 2 and the carbureter 3. This casing 1 has heads 4 and 5, having central openings, for permitting the passage of the mixture, and the carbureter and the intake manifold have flanges which are secured to the heads 4 and 5 and to each other by bolts 7 and nuts 7ª, the bolts being passed through registering openings in the flanges and heads and engaged by the nuts, as shown. The openings through the heads 4 and 5 are ports, and a valve, to be later described, coöperates with the port of the head 4. The upper section of the casing 1 is seated in an annular groove 8 in the head 5, and the lower section is seated on an annular shoulder or rabbet 9 in the head 4. At their adjacent ends the sections abut, and they are clamped together and to the heads by the bolts 7 and the nuts 7ª.

The valve 10 before-mentioned is adapted to seat upon a rabbet encircling the opening through the head 4, and within the rabbet or shoulder 9, and the valve has an annular series of ports or openings, for permitting the proper amount of mixture to pass when the valve is closed. These openings are provided according to the speed required, to admit the right amount of gas for a given speed.

The valve has a hollow stem 11, which is provided at its upper end with a marginal flange 12, and a sleeve 13 fits within the stem 11. The sleeve 13 is journaled upon a rod 16, which is held at its ends in spider supported bearings 15 at the center of the heads 4 and 5.

The ends of the sleeve 13 engage the bearings to prevent longitudinal movement of the sleeve, and a coil spring 17 is arranged between the stop 14 adjustable on the sleeve, and the stem 11, the spring being arranged within an enlargement in the bore of the stem, and the spring acts normally to hold the valve off its seat. It will be obvious that by turning the stop 14, which is a nut threaded onto the sleeve, the tension of the spring may be varied. This sleeve 13 carries a propeller 18, in the form of radially extending spiral blades, and it will be evident that the propeller will be operated by the inrush of the gas from the carbureter to the intake manifold, to cause the propeller and the sleeve to be rotated.

The sleeve 13 carries near its upper end, and just below the propeller, a cross head 19, and the cross head has a depending pin 20, which engages in a radial notch or recess in the flange 12 of the stem, the pin constraining the stem and the valve to rotate with the sleeve 13 and the cross head 19. A weighted lever 21 is pivoted to each end of the head, each of the said levers having a fork at its upper end, whose arms extend inwardly at the opposite sides of the head.

The valve and stem are slidable on the sleeve, and since the arms of the fork engage the upper end of the stem, it will be obvious that when the weighted levers are thrown outwardly by centrifugal force, the valve will be depressed against the resistance of the spring to restrict the opening through the port in the head 4. It will be noticed that the fork of each weighted lever has a long and a short arm, and that the forks are similarly arranged.

In operation, the gas rushing through the casing 1 will rotate the propeller, which will carry with it in its rotation the valve and the overspeed device. Any increase in speed in the rotation of the propeller, caused by an increase in the speed of the inrush of mixture, will swing the weights outwardly, and the greater the increase in speed, the further the weights will be swung outwardly, and the closer the valve will be moved toward its seat. Thus the speed of the engine controls the feed of the mixture. The overspeed device can be applied to any engine in a little while at a very small cost.

We claim:

1. Controlling means for explosive engines, comprising a valve disposed in the path of the mixture for controlling its supply, said valve having a hollow stem, a rod passing through the valve stem, a spring mounted upon the rod within the stem of the valve and normally holding the valve open, a stop adjustable on the rod and engaging the spring to regulate its tension, a centrifugal governor mounted upon said rod and adapted to close the valve, and a propeller actuated by the flow of the mixture and connected with the governor for imparting rotary movement thereto.

2. Controlling means for explosive engines, comprising a valve disposed in the path of the mixture for controlling its supply, said valve having a hollow stem having an outer terminal flange, a rod passing through the valve and stem, a spring mounted upon the rod within the stem of the valve and normally holding the valve open, a stop adjustable on the rod and engaging the spring to regulate its tension, a cross head mounted upon the rod and connected with the flange of the valve stem, governor arms pivoted to the cross head and engaging the flange of the valve stem, and a propeller actuated by the flow of the mixture and connected with the said cross head to rotate the governor.

3. Controlling means for explosive engines, comprising a casing, heads secured to the ends of the casing, one of said heads having a valve seat, a rod passing through the casing and supported at its ends in the heads thereof, a valve mounted upon the rod and having a hollow stem, a spring mounted upon the rod within the stem of the valve and normally holding the valve away from its seat, a stop adjustable upon the rod and engaging the spring to regulate its tension, a centrifugal governor mounted upon the rod and adapted to close the valve, and a propeller mounted upon the rod and connected with the governor for imparting rotary movement thereto.

RICHARD GUILL.
GLEN LAKE SHAWVER.